(12) United States Patent
Ando

(10) Patent No.: US 11,331,845 B2
(45) Date of Patent: May 17, 2022

(54) BLOW MOLDING APPARATUS

(71) Applicant: NISSEI ASB MACHINE CO., LTD., Nagano (JP)

(72) Inventor: Masatoshi Ando, Nagano (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 0 days.

(21) Appl. No.: 17/051,309

(22) PCT Filed: Apr. 26, 2019

(86) PCT No.: PCT/JP2019/018164
§ 371 (c)(1),
(2) Date: Oct. 28, 2020

(87) PCT Pub. No.: WO2019/212060
PCT Pub. Date: Nov. 7, 2019

(65) Prior Publication Data
US 2021/0237331 A1 Aug. 5, 2021

(30) Foreign Application Priority Data

May 2, 2018 (JP) .............................. JP2018-088818

(51) Int. Cl.
*B29C 49/18* (2006.01)
*B29C 49/42* (2006.01)
(Continued)

(52) U.S. Cl.
CPC .......... *B29C 49/4205* (2013.01); *B29C 49/18* (2013.01); *B29C 49/32* (2013.01);
(Continued)

(58) Field of Classification Search
CPC .... B29C 49/4242; B29C 49/18; B29C 49/185
See application file for complete search history.

(56) References Cited

U.S. PATENT DOCUMENTS 5,178,817 A * 1/1993 Yamada .............. B29C 49/0073
264/295
5,468,443 A * 11/1995 Takada ................. B29C 49/061
264/532
(Continued)

FOREIGN PATENT DOCUMENTS

EP   2 599 610 B1   1/2018
JP     3893054 B2   3/2007
(Continued)

OTHER PUBLICATIONS

Written Opinion of the International Searching Authority issued in International Application No. PCT/JP2019/018164, dated Jul. 30, 2019, along with an English translation thereof.
(Continued)

*Primary Examiner* — Robert B Davis
(74) *Attorney, Agent, or Firm* — Greenblum & Bernstein, P.L.C.

(57) ABSTRACT

A configuration including: a primary blow molding station including: an injection molding part configured to injection-mold a plurality of preforms simultaneously; a primary blow molding part configured to blow-mold the preform to form a first blow-molded article; and a first transport device including a first transport path and configured to intermittently circulate and transport a plurality of the preforms and the first blow-molded article along the first transport path at a predetermined interval; and a secondary blow molding station installed independently of the primary blow molding station, the secondary blow molding station including: a secondary blow molding part configured to blow-mold the first blow-molded article to form a resin container; and a second transport device configured to hold the first blow-molded article at a downstream side of the primary blow
(Continued)

molding part in the first transport path and transport the first blow-molded article to the secondary blow molding part.

5 Claims, 7 Drawing Sheets

(51) Int. Cl.
    *B29C 49/32*         (2006.01)
    *B29C 49/06*         (2006.01)
    *B29L 31/00*         (2006.01)
    *B29C 49/20*         (2006.01)

(52) U.S. Cl.
    CPC .......... *B29C 49/4242* (2013.01); *B29C 49/06* (2013.01); *B29C 2049/2039* (2013.01); *B29L 2031/7158* (2013.01)

(56) References Cited

U.S. PATENT DOCUMENTS 7,033,535 B1 * 4/2006 Limanjaya .......... B29C 49/0073
                                                         264/531

2003/0132186 A1 * 7/2003 Ferguson .......... B29C 49/4242
                                                          215/40
2016/0207243 A1     7/2016 Ozaki
2019/0022913 A1     1/2019 Takehana et al.
2019/0152121 A1     5/2019 Horigome et al.

FOREIGN PATENT DOCUMENTS

| | | |
|---|---|---|
| JP | 2011-157135 A | 8/2011 |
| JP | 5794567 B2 | 10/2015 |
| JP | 2016-30428 A | 3/2016 |
| WO | WO-2012014950 A1 * | 2/2012 .......... B29C 49/421 |
| WO | 2015/025797 A1 | 2/2015 |
| WO | 2017/170942 A1 | 10/2017 |
| WO | 2018/003775 A1 | 1/2018 |

OTHER PUBLICATIONS

International Search Report issued in International Patent Application No. PCT/JP2019/018164, dated Jul. 30, 2019, along with an English translation thereof.

* cited by examiner

BLOW MOLDING APPARATUS

TECHNICAL FIELD

The present invention relates to a blow molding apparatus for forming a resin container by blow-molding a preform.

BACKGROUND ART

Conventionally, containers (bottles) formed of thermoplastic resin materials are widely used in society because of being excellent in lightness and durability, being easy to handle, and easily ensuring desired aesthetics. A typical example of this type of container is a PET bottle that can be filled with a liquid such as a beverage.

Such a container is generally formed by a so-called blow molding method. Examples of the blow molding method include a hot parison type in which a preform (preliminary molded article) is transported to a blow mold while retaining heat during injection molding and the preform is blow-molded and stretched, and a cold parison type in which a preform cooled to room temperature after injection molding is reheated to an appropriate temperature and is then blow-molded and stretched.

There are various methods as a blow molding method for the purpose of improving heat resistance of the container, and there are so-called one-blow method and two-blow method. In the one-blow method, a temperature-adjusted blow mold is used to blow-mold the preform once, thereby forming a resin container which is a final molded article.

In the two-blow method, the preform is blow-molded with a high-temperature heat treatment mold to form a first blow-molded article, and then the first blow-molded article is blow-molded with a further temperature-adjusted final mold to form a resin container which is a final molded article (see, for example, Patent Literature 1).

In Patent Literature 1, the injection-molded preform is blow-molded to form a first blow-molded article, and the first blow-molded article is once pooled. Thereafter, the first blow-molded article cooled to room temperature is subjected to a heat treatment to form an intermediate molded article, and the intermediate molded article is blow-molded to form a final molded article (resin container). When the resin container is formed by such a two-blow method, properties (for example, heat resistance) of the resin container can be improved.

However, in recent years, shapes of resin containers are also diversifying. For example, a resin container with a handle and a resin container in which a central axis of a neck portion is deviated from a central axis of a body portion (so-called off-center container) have been developed. The container with a handle and the off-center container are generally formed by the one-blow method (see, for example, Patent Literature 2).

CITATION LIST

Patent Literature

Patent Literature 1: Japanese Patent No. 3794567
Patent Literature 2: Japanese Patent No. 3893054

SUMMARY OF INVENTION

Technical Problem

As described above, when the resin container is blow-molded by the so-called two-blow method, the properties (for example, heat resistance) of the resin container can be improved. However, since the two-blow type blow molding apparatus in the related art is relatively large, there are problems that an installation location is limited and an introduction cost of the apparatus is high. In addition, when the container with a handle or the off-center container is to be molded by the two-blow type blow molding apparatus, problems such as an increase in size of the apparatus and an increase in introduction cost are likely to occur.

The present invention has been made in view of such circumstances, and an object thereof is to provide a blow molding apparatus which can save space and can form a resin container having improved properties such as heat resistance

Solution to Problem

An aspect of the present invention for solving the above problems relates to a blow molding apparatus for forming a resin container by blow-molding a preform, the blow molding apparatus including: a primary blow molding station including: an injection molding part configured to injection-mold a plurality of the preforms simultaneously; a primary blow molding part configured to blow-mold the preform to form a first blow-molded article, and a first transport device including a first transport path which connects the injection molding part and the primary blow molding part, and configured to intermittently circulate and transport a plurality of the preforms and the first blow-molded article along the first transport path at a predetermined interval; and a secondary blow molding station installed independently of the primary blow molding station, the second blow molding station including: a secondary blow molding part configured to blow-mold the first blow-molded article to form the resin container; and a second transport device configured to hold the first primary blow molding part at a downstream side of the primary blow molding part in the first transport path and transport the first blow-molded article to the secondary blow molding part.

Here, it is preferable that the second transport device includes a gripping member configured to grip the first blow-molded article and a second transport path extending in a direction orthogonal to the first transport path, and the second transport device moves the gripping member gripping the first blow-molded article along the second transport path to transport the first blow-molded article to the secondary blow molding part.

It is preferable that, in the injection molding part, N1 preforms are injection-molded simultaneously, in the primary blow molding part, N2 preforms are blow-molded simultaneously, in the secondary blow molding part, N3 first blow-molded articles are blow-molded simultaneously, and N1, N2, and N3, which represent numbers being molded simultaneously, are set to satisfy a relationship of N1:N2:N3=4:1:1 or 3:1:1.

It is preferable that, in a case where the resin container is a resin container with a handle, the blow molding apparatus further includes: a handle supply device connected to the secondary blow molding station and configured to supply the handle to the secondary blow molding part.

It is preferable that, in a case where the resin container is a resin container in which a central axis of a neck portion is disposed at a position deviated from a central axis of a body portion, the secondary blow molding station includes a pressurizing device configured to apply a pressure to curve a body portion of the first blow-molded article transported by the second transport device, and in the secondary blow molding part, the first blow-molded article whose body portion is curved by the pressurizing device is blow-molded.

Advantageous Effects of Invention

According to the blow molding apparatus of the present invention, with the two-blow method, the resin container can be efficiently formed, and the properties (for example, heat resistance) of the resin container can be improved. In addition, the blow molding apparatus according to the present invention can also form, for example, a container with a handle or an off-center container. That is, according to the blow molding apparatus of the present invention, a container with a handle or an off-center container with improved properties such as heat resistance can be formed.

In addition, according to the present invention, size reduction (space saving) of the blow molding apparatus can be achieved. Therefore, there are few restrictions on the installation location, and an increase in introduction cost can be prevented.

DESCRIPTION OF EMBODIMENTS

Hereinafter, a blow molding apparatus according to an embodiment of the present invention will be described in detail with reference to the drawings.

First, an example of a shape of a resin container formed by the blow molding apparatus according to the embodiment of the present invention will be described briefly.

Figure 1:
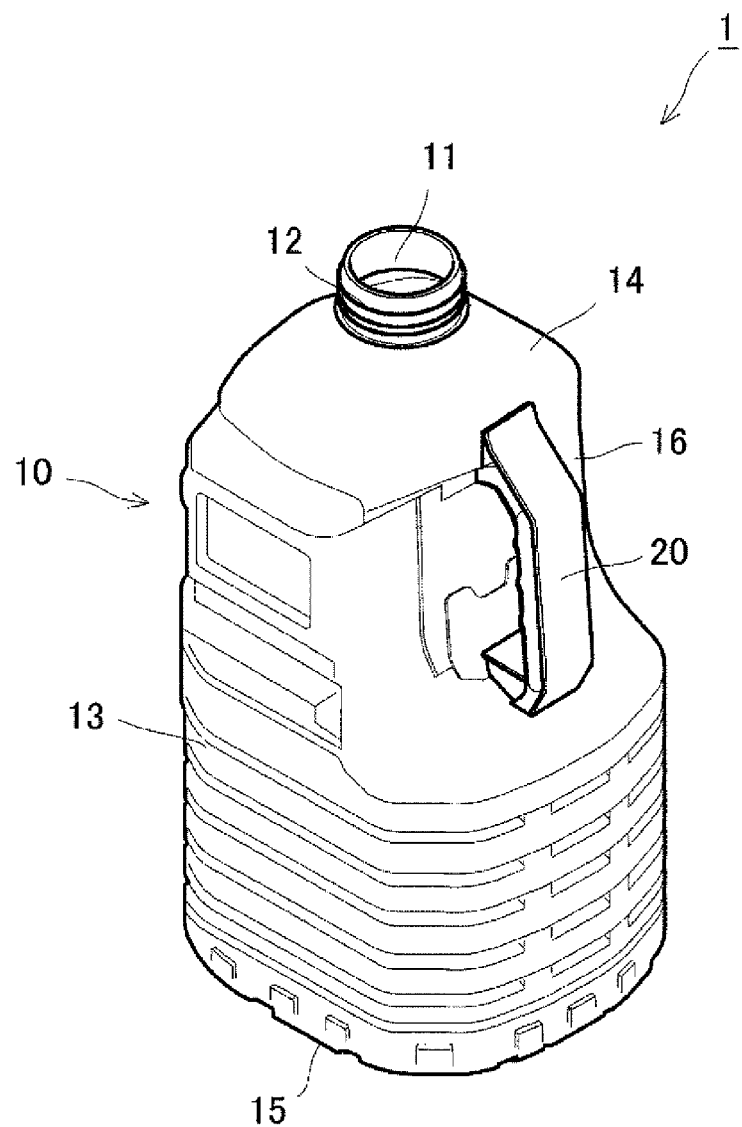
FIG. 1 is a perspective view showing an example of a resin container formed by a blow molding apparatus according to the present invention.
Figure 2:
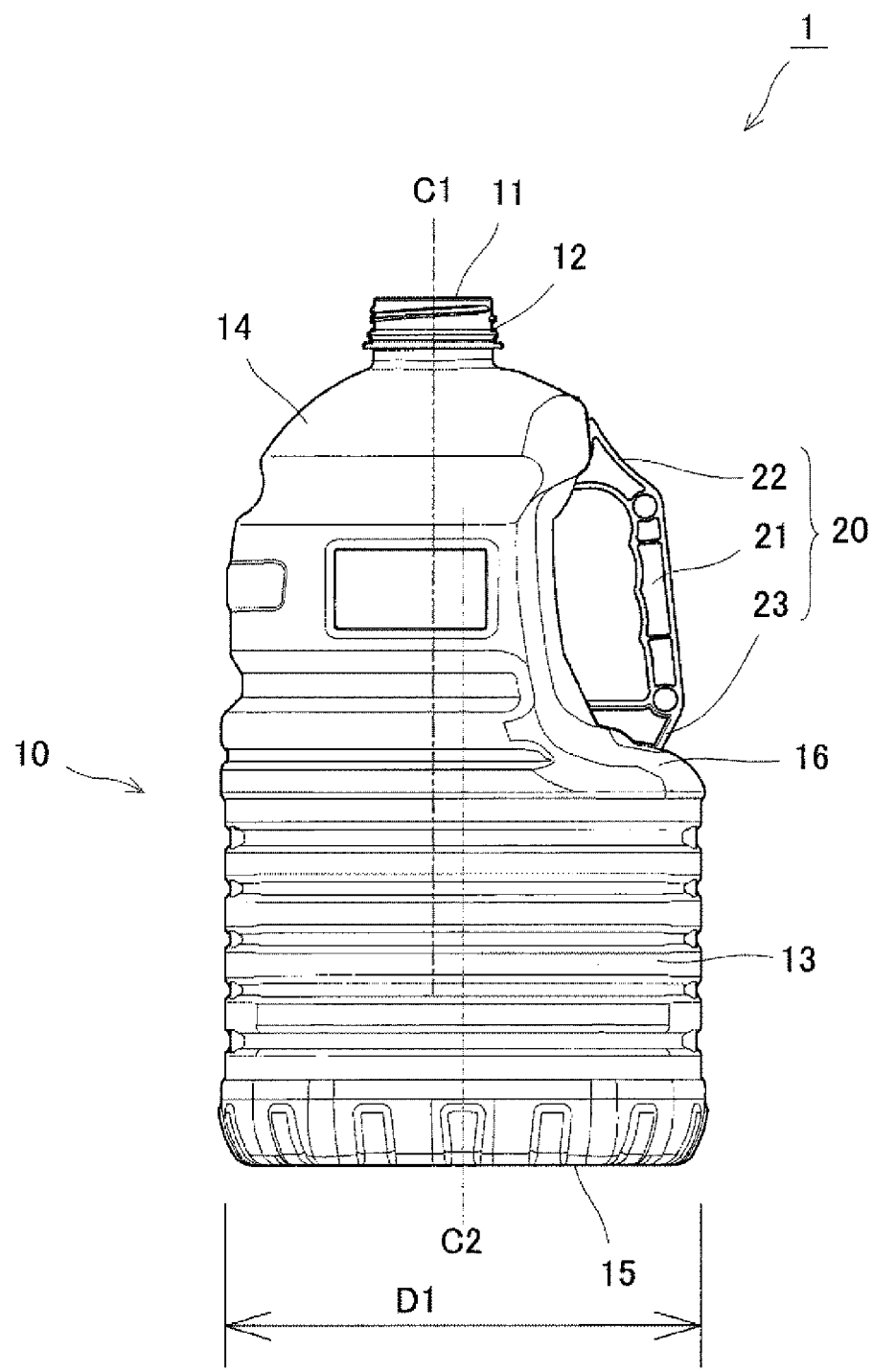
FIG. 2 is a front view showing the example of the resin container formed by the blow molding apparatus according to the present invention.
Figure 3:
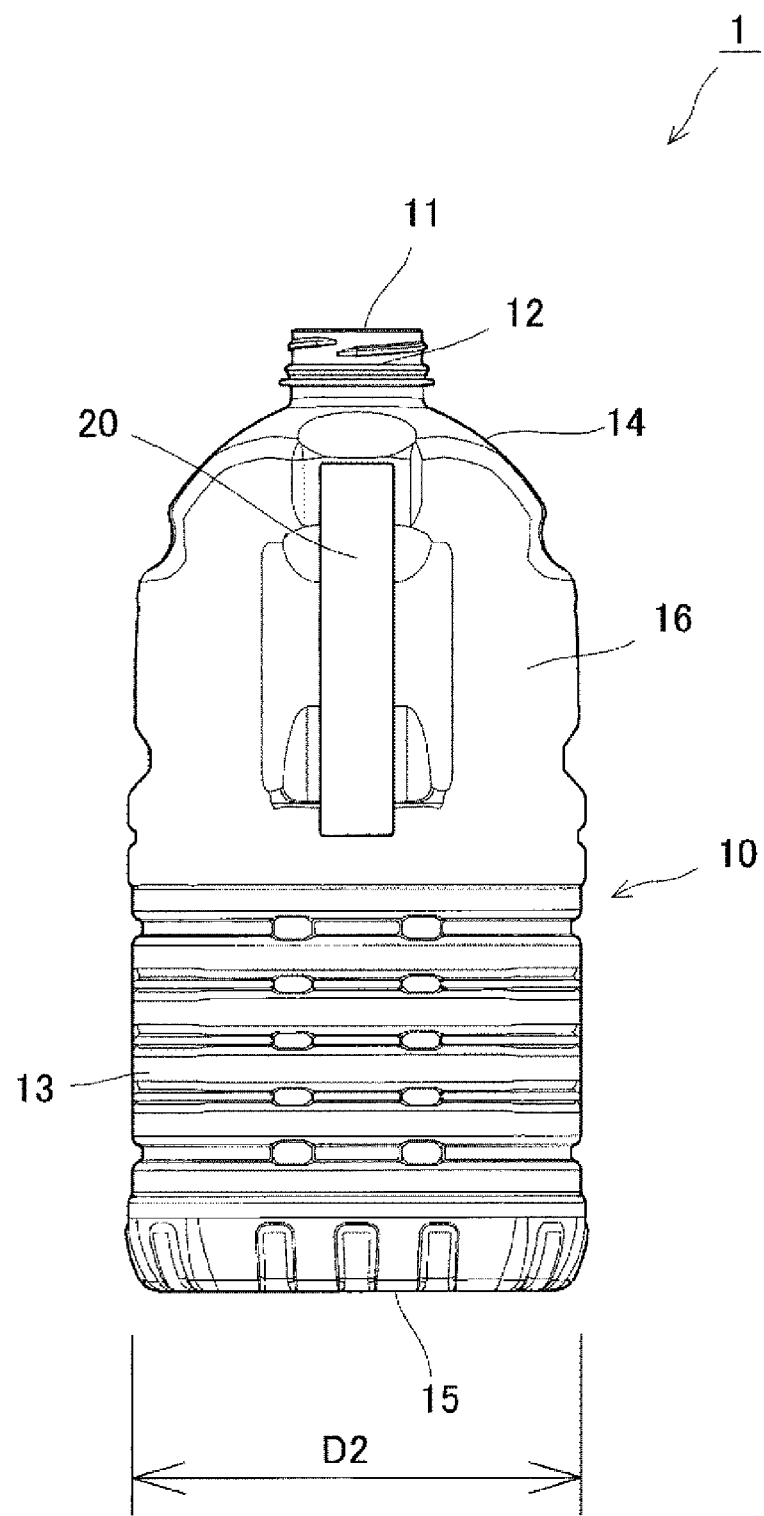
FIG. 3 is a side view showing the example of the resin container formed by the blow molding apparatus according to the present invention.

As shown in FIG. 1 to FIG. 3, a resin container 1 is a container for filling a liquid or the like, and includes a container body 10 and a container handle 20. The container body 10 is made of, for example, polyethylene terephthalate (PET) resin, and induces a neck portion 12 having an opening 11 at an upper end thereof, a cylindrical body portion 13, a shoulder portion 14 connecting the neck portion 12 and the body portion 13 and gradually expanding from a neck portion 12 side, and a bottom portion 15 sealing one end of the body portion 13.

A recess portion 16 for a handle is formed in an upper half of the body portion 13, and the container handle 20 is disposed in the recess portion 16 and is attached to the container body 10.

The resin container 1 according to the present embodiment is a so-called off-center container, and a central axis C1 of the opening of the neck portion 12 is disposed at a position deviated from a central axis C2 of the body portion 13 (see FIG. 2). The container body 10 is off-center only when viewed from the front as shown in FIG. 2, and is not off-center when viewed from the side as shown in FIG. 3.

A diameter D1 of the body portion 13 when viewed from the front is formed longer than a diameter D2 of the body portion 13 when viewed from the side. That is, the body portion 13 is formed in a substantially flat shape (substantially elliptical shape) including a major axis and a minor axis in a cross section thereof. Of course, the cross-sectional shape of the body portion 13 is not particularly limited. For example, the diameter D1 of the body portion 13 may be smaller than or equal to the diameter D2 of the body portion 13.

The container handle 20 is provided with a handle body portion 21 arranged in the recess portion 16 of the container body 10 along an up-down direction thereof and an upper engagement part 22 and a lower engagement part 23 protruding laterally with respect to the vicinity of both end portions of the handle body portion 21 in the up-down direction. The container handle 20 is formed in a substantially U shape as a whole.

When forming the container body 10 by blow molding, the container handle 20 is integrated with the container body 10 by wrapping a resin around tip end portions of the upper engagement part 22 and the lower engagement part 23.

As described below, the container body 10 of the resin container 1 is molded by a so-called two-blow method, and has heat resistance that can withstand a temperature of, for example, about 85° C. to 95° C.

Hereinafter, a blow molding apparatus for forming the resin container (heat resistant container) 1 having such heat resistance will be described.

As shown in FIG. 4 to FIG. 7, a blow molding apparatus 100 according to the present invention includes a primary blow molding station 200, a secondary blow molding station 300 installed independently of the primary blow molding station 200, and a handle supply device 400 configured to supply the container handle 20 to the secondary blow molding station 300.

The primary blow molding station 200 include an injection molding part 210, a temperature adjustment part (heating part) 220, a primary blow molding part 230, a take-out part 240, and a first transport device 250.

The injection molding part 210 molds a preform (preliminary molded article) 30 by injecting a resin material from an injection device 211 into an injection molding mold 212. The injection molding mold 212 includes an injection core mold, an injection cavity mold, and a neck mold. The injection molding part 210 molds a plurality of preforms 30, for example, three or four preforms 30 at one time. Of course, the number of preforms 30 formed by the injection molding part 210 at one time is not particularly limited. The temperature adjustment part (reheating part) 220 adjusts the temperature of the preform 30 before primary blow molding.

In the primary blow molding part 230, the preform 30 is blow-molded to form a first blow-molded article 40. The primary blow molding part 230 includes a primary blow mold 231 and the first blow-molded article 40 is formed by introducing high-pressure air into the preform 30 disposed in the primary blow mold 231.

Figure 4:
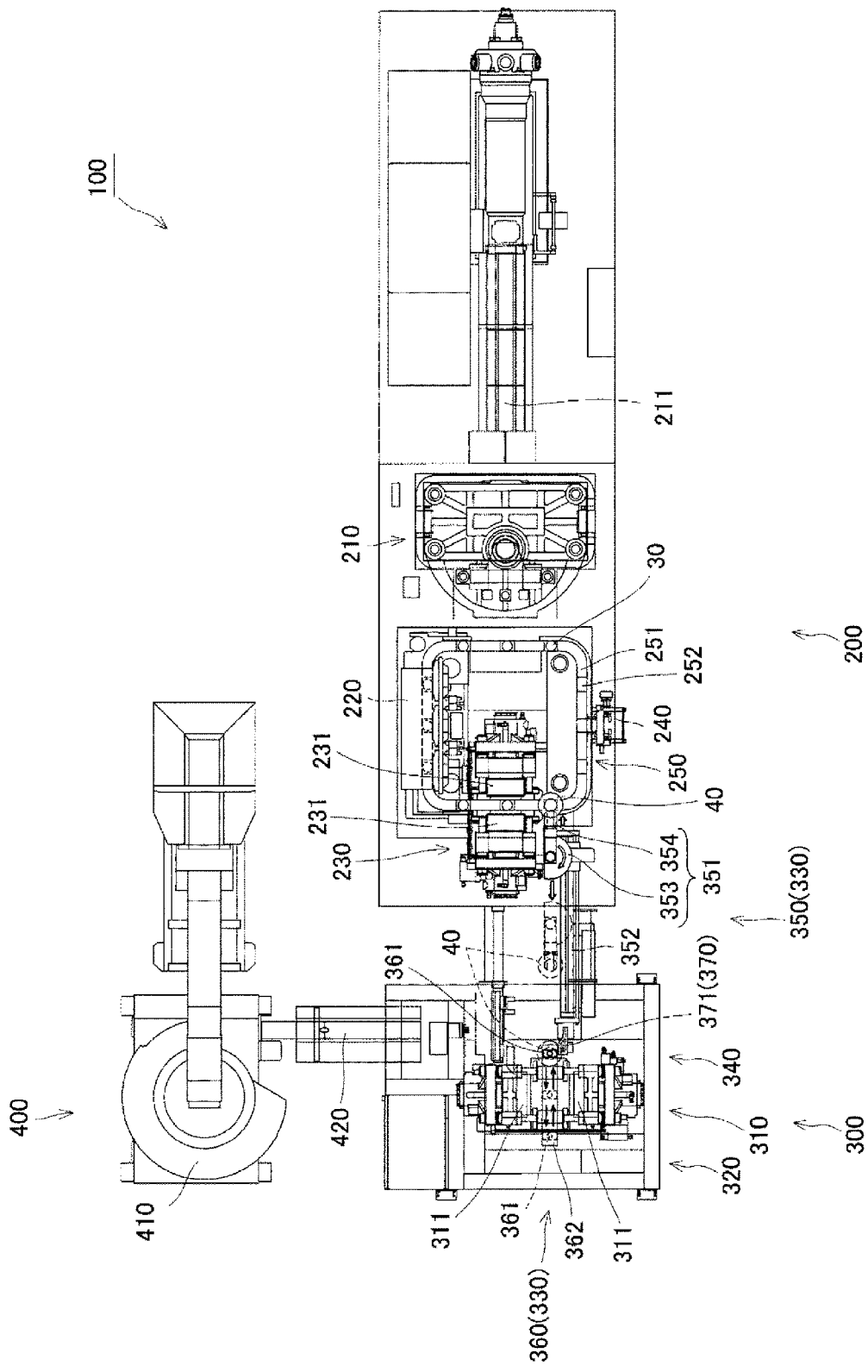
FIG. 4 is a plan view showing a blow molding apparatus according to one embodiment of the present invention.
Figure 5:
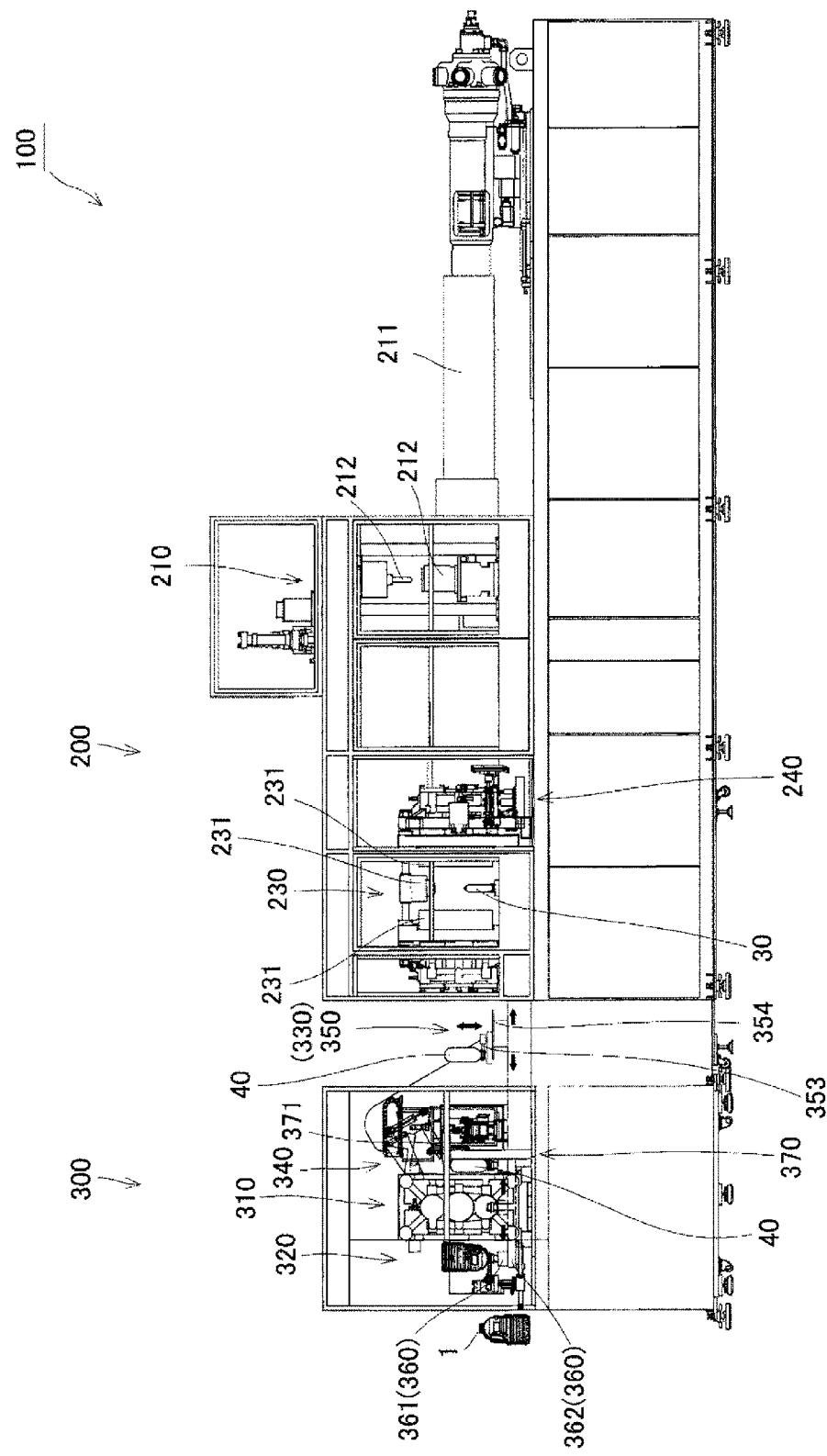
FIG. 5 is a front view showing the blow molding apparatus according to the embodiment of the present invention.
Figure 6:
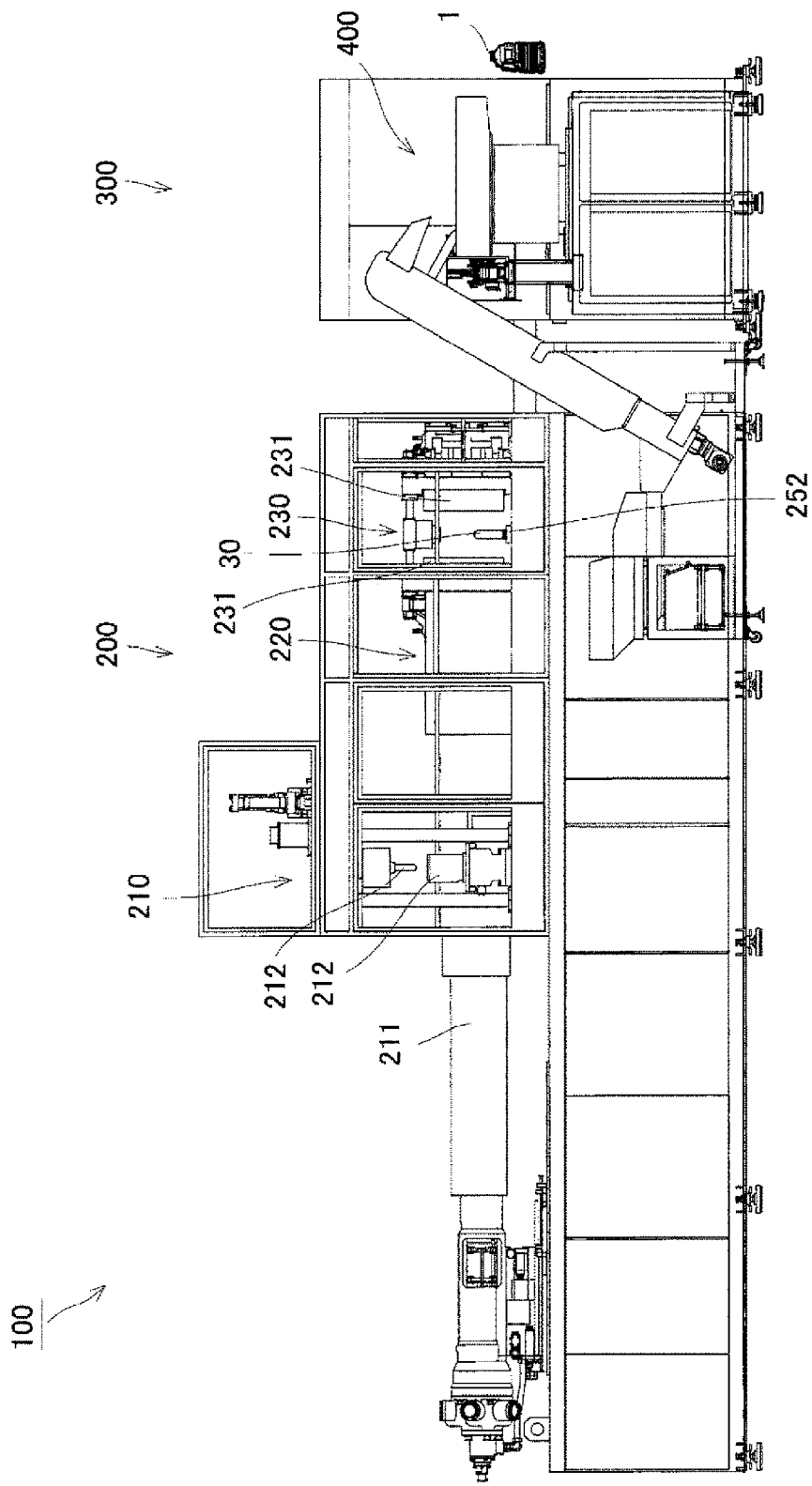
FIG. 6 is a rear view showing the blow molding apparatus according to the embodiment of the present invention.
Figure 7:
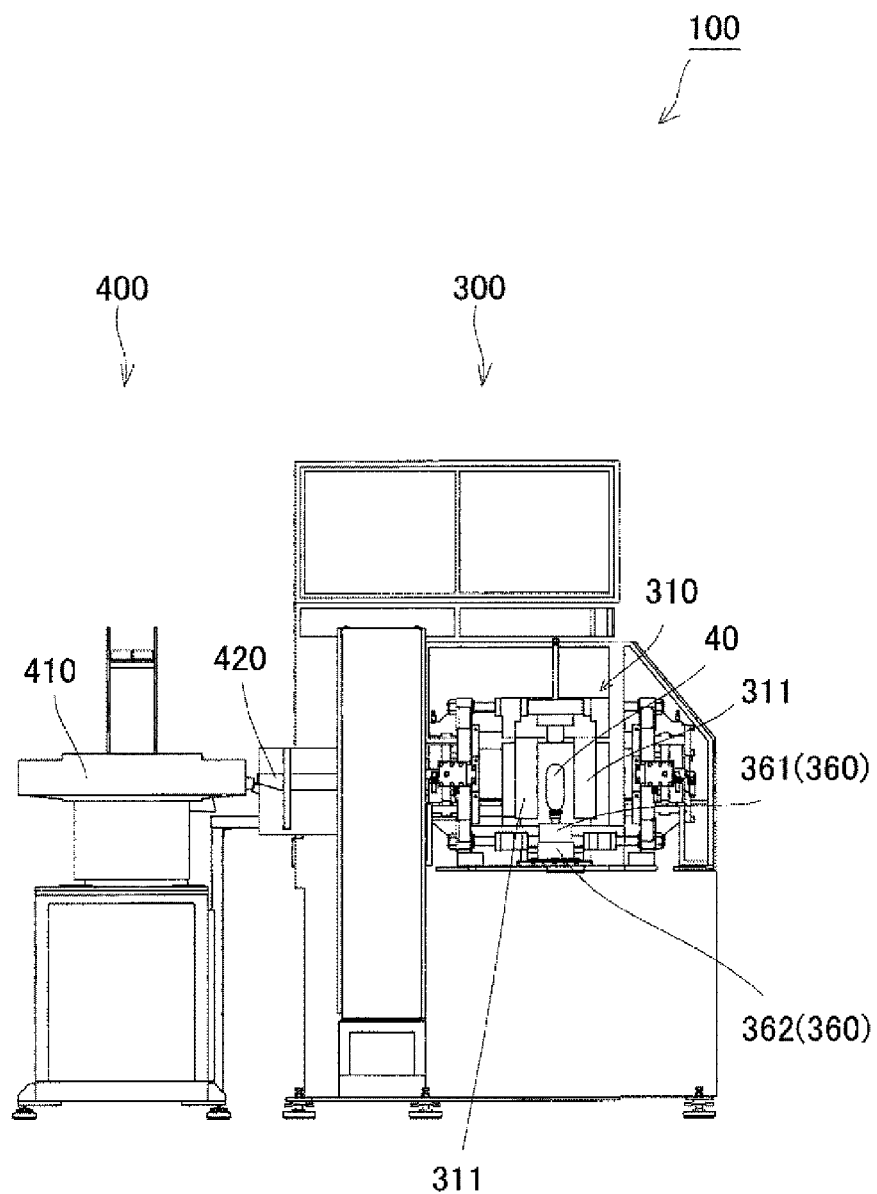
FIG. 7 is a left side view showing the blow molding apparatus according to the embodiment of the present invention.

The primary blow mold 231 includes, for example, a pair of first blow cavity split molds and a first bottom mold, and is configured to be capable of molding one first blow-molded article 40 from one preform 30. Thereafter, in the primary blow molding part 230, high-pressure air is exhausted to open the primary blow mold 231 and the first blow-molded article 40 is taken out from the primary blow mold 231. The primary blow mold 231 is set to a high temperature of, for example, 160° C. to 250° C. in order to heat-treat the first blow-molded article 40 in the blow state to promote improvement of crystallization density and removal of residual stress to improve the heat resistance. In FIG. 4 to FIG. 6, a state where the first blow cavity split mold is in a mold opening position is shown.

In the case of taking the first blow-molded article 40 formed by the primary blow molding part 230 out from the primary blow molding station 200 as described later, the first blow-molded article is taken out by the take-out part 240.

The first transport device 250 includes a substantially quadrangular first transport path 251 along which the preform circulates through the injection molding part 210, the temperature adjustment part 220, the primary blow molding part 230, and the take-out part 240, and a first holding member 252 moving along the first transport path 251. The first transport device 250 transports the preform 30 placed on the first holding member 252 from the injection molding part 210 to the primary blow molding part 230 along the first transport path 251.

In addition, the first transport device 250 can transport the first blow-molded article 40 formed by the primary blow molding part 230 out of the primary blow molding part 230 and transport the first blow-molded article 40 to the take-out part 240 along the first transport path 251. That is, the first transport device 250 intermittently circulates and transports a plurality of the preforms 30 and the first blow-molded article 40 along the first transport path 251 at a predetermined interval.

When the first blow-molded article 40 is taken out by the take-out part 240 or the like, the first holding member 252 is transported into the injection molding part 210 along the first transport path 251 and a new preform 30 is placed thereon. In the present embodiment, the first holding member 252 holds the preform 30 or the first blow-molded article 40 in an inverted state (a state where the neck portion faces downward).

The secondary blow molding station 300 is installed independently of the primary blow molding station 200, and includes a secondary blow molding part (final blow molding part) 310, a collecting part 320, a second transport device 330, and a standby part 340.

The secondary blow molding part 310 includes a secondary blow mold (final blow mold) 311 including a pair of second blow cavity split molds and a second bottom mold, and blow-molds the first blow-molded article 40 transported from the primary blow molding station 200 to the secondary blow mold 311 by the second transport device 330 to form the resin container 1 as a final molded article. The resin container 1 formed by the secondary blow molding part 310 is collected by the collecting part 320 and transported to a predetermined storage location by a predetermined transport unit, for example, a belt conveyor. In FIG. 4 to FIG. 6, a state where the second blow cavity split mold is in a mold opening position is shown.

The secondary blow mold 311 is adjusted to a temperature of 85° C. to 105° C. in order to adjust the temperature of the first blow-molded article 40 to promote the shape formation and the heat resistance of the resin container 1. In addition, the secondary blow molding part 310 includes, for example, one secondary blow mold, and the secondary blow mold 311 is configured to form one resin container 1.

Here, the first blow-molded article 40 is transported from the primary blow molding part 230 to the secondary blow molding part 310 by the second transport device 330. Specifically, the second transport device 330 includes an upstream transport part 350 and a downstream transport part 360. The upstream transport part 350 holds the first blow-molded article 40 at a downstream side of the primary blow molding part 230 in the first transport path 251 and transports the first blow-molded article 40 to the standby part 340. Thereafter, the downstream transport part 360 transports the first blow-molded article 40 from the standby part 340 to the secondary blow molding part 310 (secondary blow mold 311).

The upstream transport part 350 includes a gripping member 351 configured to grip the first blow-molded article 40 which is being transported along the first transport path 251. The gripping member 351 grips a neck portion of the first blow-molded article 40, which is placed on the first holding member 252, in an inverted state.

In addition, the upstream transport part 350 includes a second transport path 352 extending in a direction orthogonal to the first transport path 251 at a predetermined position in the first transport path 251, that is, a position where the gripping member 351 grips the first blow-molded article 40.

The upstream transport part 350 moves the gripping member 351 gripping the first blow-molded article 40 along the second transport path 352. The gripping member 351 includes a fixing plate 353 configured to slidably move along the second transport path 352, and a chuck member 354 provided on an upper surface of the fixing plate 353. The chuck member 354 is provided on the fixing plate 353 so as to be capable of moving forward and backward (advance and retract) with respect to the first transport path 251, rotating 180 degrees, and moving up and down.

A specific operation of the gripping member 351 is as follows. The chuck member 354 in an open state is advanced in the direction of the first transport path 251. When the chuck member 354 is in a closed state, the first blow-molded article 40 (neck portion) is held. The chuck member 354 is raised to pull out (remove) the first blow-molded article 40 from the first holding member 252. The chuck member 354 in a raised position is retracted from the first transport path 251 and then rotated 180 degrees.

In this state, the chuck member 354 is slidably moved along the second transport path 352 via the fixing plate 353. When reaching the standby part 340, the chuck member 354 is lowered and the first blow-molded article 40 is inserted (placed) to a second holding member 361 as described later. The chuck member 354 is made into an open state and retracted from the standby part 340. In this state, the chuck member 354 is rotated 180 degrees and returned to the vicinity of the first transport path 251.

The first blow-molded article 40 is transported from the first transport path 251 to the standby part 340 by the upstream transport part 350.

The downstream transport part 360 includes the second holding member 361 configured to hold the first blow-molded article 40 transported by the upstream transport part 350. The second holding member 361 includes a convex portion to be inserted into the neck portion of the first blow-molded article 40, and holds the first blow-molded article 40 in an inverted state. In addition, the downstream transport part 360 includes a third transport path 362 disposed on an extension line of the second transport path 352 of the upstream transport part 350. The third transport path 362 is continuously provided from the standby part 340 to the collecting part 320 via the secondary blow molding part 310. The downstream transport part 360 is configured such that the second holding member 361 can be slidably moved along the third transport path 362. That is, the downstream transport part 360 is configured such that the second holding member 361 can be moved intermittently and linearly from the standby part 340, the secondary blow molding part 310, the collecting part 320, and the standby part 340 in this order.

The first blow-molded article 40 is moved from the standby part 340 to the secondary blow molding part 310 (secondary blow mold 311) by such a downstream transport part 360. More specifically, when the first blow-molded article 40 is to be transported to the standby part 340 by the upstream transport part 350, the second holding member 361 is on standby at the standby part 340. The first blow-molded article 40 transported to the standby part 340 by the upstream transport part 350 is placed on the second holding member 361. Then, the second holding member 361 on which the first blow-molded article 40 is placed is transported to the secondary blow molding part 310.

In the present embodiment, the second holding member 361 is moved along the third transport path 362 by the downstream transport part 360 whose drive source is different from that of the upstream transport part 350. Alternatively, the second holding member 361 may be moved along the third transport path 362 by a drive source same as that of the upstream transport part 350.

A transport time between the primary blow molding station 200 and the secondary blow molding station 300 is adjusted such that the temperature of the first blow-molded article 40 does not drop too much, and is set, for example, within 6 seconds. In addition, in order to shorten the transport time of the first blow-molded article 40, it is desirable that the second transport path 352 and the third transport path 362 are linearly installed as described above. In this case, a traveling direction of the gripping member 351 and the second holding member 361 and a mold opening/closing direction of the secondary blow mold 311 are orthogonal to each other.

Further, a mode in which the second holding member 361 is provided in a number same as the number of simultaneous molding of the secondary blow molding part 310 (the number of cavities of the secondary blow mold 311) may be designed, and a mode in which only one second holding member 361 is provided is desirable. This mode is possible when a molding time of the secondary blow molding part 310 is shorter than a molding time of the primary blow molding part 230, and it is particularly preferable that the molding time of the secondary blow molding part 310 is ½ or less the molding time of the primary blow molding part 230.

In this case, within a total time of the molding time of the primary blow molding part 230 and the transport time of the first blow-molded article 40 by the upstream transport part 350 from the primary blow molding station 200 to the standby part 340 of the secondary blow molding station 300, the second holding member 361 positioned at the standby part 340 returns to the standby part 340 via the secondary blow molding part 310 and the collecting part 320, and can be on standby again. Accordingly, the number of parts of the secondary blow molding station 300 can be reduced, and the production cost can be reduced.

The resin container 1 according to the present embodiment is a resin container in which the central axis of the neck portion 12 is disposed at a position deviated from the central axis of the body portion 13 as described above (see FIG. 2). Therefore, the secondary blow molding station 300 includes a pressurizing device 370 configured to apply a pressure to curve the body portion of the first blow-molded article 40 transported by the upstream transport part 350. In the secondary blow molding part 310, the first blow-molded article 40 whose body portion is curved by the pressurizing device 370 is blow-molded to form the resin container 1.

The pressurizing device 370 is disposed upstream of the secondary blow molding part 310 (secondary blow mold 311) in the secondary blow molding station 300, and includes an abutting member 371 configured to abut against the body portion of the first blow-molded article 40. The body portion is curved by this abutting member 371.

As the abutting member 371, for example, a rod-shaped guide member is used. In this case, a height of the abutting member 371 is adjusted such that the abutting member 371 abuts against the body portion of the first blow-molded article 40 only when the chuck member 354 is in a raised position and does not abut against the body portion of the first blow-molded article 40 when the chuck member 354 is in a lowered position. Accordingly, when the first blow-molded article 40 is being transported by the chuck member 354 in a raised position, the abutting member 371 can automatically abut against the body portion of the first blow-molded article 40, and the body portion can be curved during the transport step.

In addition, when the chuck member 354 is lowered and the first blow-molded article 40 is inserted into the second holding member 361, the first blow-molded article 40 whose body portion is curved can be automatically separated from the abutting member 371, and the first blow-molded article 40 can be transported to the secondary blow molding part 310 without interfering with the abutting member 371. The configuration of the pressurizing device 370 is not particularly limited as long as the body portion of the first blow-molded article 40 can be pressurized and appropriately curved.

For example, the pressurizing device 370 may curve the body portion of the first blow-molded article 40 by ejecting high-temperature air to the inside or sucking the inside from a slit formed in the secondary blow molding mold during a mold closing operation when the first blow-molded article 40 is disposed in the secondary blow mold 311.

As another example, the pressurizing device 370 may include an insert mold capable of moving forward and backward with respect to the secondary blow mold 311, and the pressurizing device 370 curve the body portion of the first blow-molded article 40 by advancing the insert mold and pressing the body portion of the first blow-molded article 40 when the first blow-molded article 40 is disposed in the secondary blow mold 311.

After the first blow-molded article 40 is appropriately pressurized and curved by the pressurizing device 370, by blow-molding the first blow-molded article 40 by the secondary blow molding part 310, the resin container 1 which is a so-called off-center container can be successfully formed.

A timing for curving the first blow-molded article 40 may be any timing as long as it is before the blow molding in the secondary blow molding part 310. Therefore, without curving the body portion of the first blow-molded article 40 by the pressurizing device 370 in the secondary blow molding part 310 (secondary blow molding station 300), for example, the primary blow molding part 230 (primary blow molding station 200) may mold the first blow-molded article 40 having an off-center shape.

In addition, the resin container 1 according to the present embodiment is a container with a handle as described above, and the blow molding apparatus 100 includes the handle supply device 400 configured to supply the container handle 20 to the secondary blow molding station 300.

The handle supply device 400 includes a holding part 410 which is configured to hold a plurality of container handles 20 and a handle transport path 420 which connects the holding part 410 and the secondary blow molding station 300 and along which the container handle 20 is transported. The handle supply device 400 transports the container handle 20 to the secondary blow molding station 300 via the handle transport path 420.

The container handle 20 transported to the secondary blow molding station 300 is supplied to the secondary blow molding mold at a predetermined timing when the first blow-molded article 40 is blow-molded by the secondary blow molding part 310. Accordingly, the resin container 1 which is a container with a handle is formed by the secondary blow molding part 310.

According to the blow molding apparatus 100 of the present embodiment described above, the resin container 1 can be efficiently formed, and space saving (size reduction) of the apparatus can be achieved.

Particularly in the present embodiment, N1 preforms 30 are injection-molded simultaneously in the injection molding part 210, N2 preforms 30 are blow-molded simultaneously in the primary blow molding part 230, and N3 first blow-molded articles 40 are blow-molded simultaneously in the secondary blow molding part 310. N1, N2, and N3, which represent numbers being molded simultaneously, are set to satisfy a relationship of N1:N2:N3=4:1:1 or 3:1:1. Accordingly, the resin container 1 can be formed more efficiently.

It is desirable that a relationship among a molding time T1 of the injection molding part 210, a molding time T2 of the primary blow molding part 230, a molding time T3 of the secondary blow molding part 310, and a reciprocating movement time T4 of the gripping member 351 in the second transport path 352 satisfies a condition of $T1>4\times T2$ and $T2>T3+T4$, or a condition of $T1>3\times T2$ and $T2>T3+T4$. The molding time T1 of the injection molding part 210 may include a time for transferring the preform 30 from the injection molding part 210 to the first transport path 251.

In the blow molding apparatus 100 according to the present embodiment, the secondary blow molding station 300 is installed independently of the primary blow molding station 200. That is, the secondary blow molding station 300 is provided to be separable from the primary blow molding station 200. For example, the secondary blow molding station 300 can be connected to an existing primary blow molding station for use.

The blow molding apparatus 100 includes the primary blow molding station 200 and the secondary blow molding station 300, but it is also possible to mold a resin container (without a handle) by a one-blow method using only the primary blow molding station 200.

In this case, the first blow-molded article 40 molded by the primary blow molding part 230 is a resin container which is a final molded article, and this resin container is taken out by the take-out part 240 to the outside. For example, by performing blow-molding in a state where the temperature of the primary blow molding mold is adjusted from 85° C. to 105° C., a so-called semi-heat-resistant container that can withstand a temperature of about 75° C. can also be successfully formed by the one-blow method.

Thus, since the blow molding apparatus 100 can form a resin container by both the one-blow method and the two-blow method, a plurality of types of resin containers (heat resistant containers) can be formed relatively easily.

Although one embodiment of the present invention is described above, the present invention is not limited to the above embodiment. The present invention can be appropriately modified without departing from the scope of the invention.

For example, in the above embodiment, an off-center container with a handle is exemplified as the resin container formed by the blow molding apparatus according to the present invention. However, the shape of the resin container is not particularly limited. The blow molding apparatus according to the present invention can be applied to the formation of resin containers having any shape.

REFERENCE SIGNS LIST 1 resin container
10 container body
11 opening
12 neck portion
13 body portion
14 shoulder portion
15 bottom portion
16 recess portion
20 container handle
21 handle body portion
22 upper engagement part
23 lower engagement part
30 preform
40 first blow-molded article
100 blow molding apparatus
200 primary blow molding station
210 injection molding part
211 injection device
220 temperature adjustment part (reheating part)
230 primary blow molding part
231 primary blow mold
240 take-out part
250 first transport device
251 first transport path
300 secondary blow molding station
310 secondary blow molding part
311 secondary blow mold
320 collecting part
330 second transport device
340 standby part
350 upstream transport part
351 gripping member
352 second transport path
353 fixing plate
354 chuck member
360 downstream transport part
361 second holding member
362 third transport path
370 pressurizing device
371 abutting member
400 handle supply device
410 holding part
420 handle transport path

The invention claimed is:

1. A blow molding apparatus for forming a resin container by blow-molding a preform, the blow molding apparatus comprising:
a primary blow molding station including:
an injection molding part configured to injection-mold a plurality of the preforms simultaneously;
a primary blow molding part configured to blow-mold the preform to form a first blow-molded article; and
a first transport device including a first transport path which connects the injection molding part and the primary blow molding part, and configured to intermittently circulate and transport a plurality of the preforms and the first blow-molded article along the first transport path at a predetermined interval; and
a secondary blow molding station installed independently of the primary blow molding station, the second blow molding station including:
   a secondary blow molding part configured to blow-mold the first blow-molded article to form the resin container; and
   a second transport device configured to hold the first blow-molded article at a downstream side of the primary blow molding part in the first transport path and transport the first blow-molded article to the secondary blow molding part,
wherein the second transport device includes a second transport path extending in a direction orthogonal to a portion of the first transport path at which a primary blow mold of the primary blow molding part is located, the second transport device moving the first blow-molded article along the second transport path to transport the first blow-molded article from the first transport path toward the secondary blow molding part.

2. The blow molding apparatus according to claim 1,
wherein the second transport device includes a gripping member configured to grip the first blow-molded article, and the second transport device moves the gripping member gripping the first blow-molded article along the second transport path to transport the first blow-molded article from the first transport path to the secondary blow molding part.

3. The blow molding apparatus according to claim 1,
wherein in the injection molding part, N1 preforms are injection-molded simultaneously,
wherein in the primary blow molding part, N2 preforms are blow-molded simultaneously,
wherein in the secondary blow molding part, N3 first blow-molded articles are blow-molded simultaneously, and
wherein N1, N2, and N3, which represent numbers being molded simultaneously, are set to satisfy a relationship of N1:N2:N3=4:1:1 or 3:1:1.

4. The blow molding apparatus according to claim 1,
wherein the resin container is a resin container with a handle, and
wherein the blow molding apparatus further comprises: a handle supply device connected to the secondary blow molding station and configured to supply the handle to the secondary blow molding part.

5. The blow molding apparatus according to claim 1,
wherein the resin container is a resin container in which a central axis of a neck portion is disposed at a position deviated from a central axis of a body portion,
wherein the secondary blow molding station includes a pressurizing device configured to apply a pressure to curve a body portion of the first blow-molded article transported by the second transport device, and
wherein in the secondary blow molding part, the first blow-molded article whose body portion has been curved by the pressurizing device is blow-molded.

* * * * *